United States Patent [19]

Gaines, Jr. et al.

[11] 4,064,330

[45] Dec. 20, 1977

[54] CARBON ELECTRODE ASSEMBLY FOR LITHIUM FUSED SALT BATTERY

[76] Inventors: Fredrick William Gaines, Jr.; Ethel May Gaines, both of 6979 N. Meadow Drive, Painesville, Ohio 44077

[21] Appl. No.: 719,564

[22] Filed: Sept. 1, 1976

[51] Int. Cl.$^2$ .............................................. H01M 4/58
[52] U.S. Cl. ...................................... 429/218; 429/237
[58] Field of Search ..................... 429/237, 233–246, 429/218, 103, 16

[56] References Cited

U.S. PATENT DOCUMENTS

| | | | |
|---|---|---|---|
| 3,192,071 | 6/1965 | Vinal | 429/218 X |
| 3,485,677 | 12/1969 | Balaguer | 429/233 X |
| 3,565,694 | 2/1971 | Chireau | 429/218 X |
| 3,817,789 | 6/1974 | Stark et al. | 429/237 |
| 3,829,327 | 8/1974 | Omori et al. | 429/218 |
| 3,833,421 | 9/1974 | Rubischko | 429/233 X |
| 3,922,174 | 11/1975 | Heller | 429/218 X |

Primary Examiner—Charles F. LeFevour
Attorney, Agent, or Firm—Fay & Sharpe

[57] ABSTRACT

An improved electrode assembly is provided which is adapted for use in a lithium-type fused salt battery. The electrode assembly comprises an electrically conductive current collector member, an electrically conductive header for making electrical contact with the electrical collector member, and a surface layer of porous carbon which essentially surrounds the exposed surface of the collector member with the porous carbon having the ability to absorb lithium ions and preferably an apparent density ranging from about 0.7 to about 1.0 grams per cubic centimeter.

8 Claims, 3 Drawing Figures

CARBON ELECTRODE ASSEMBLY FOR LITHIUM FUSED SALT BATTERY

BACKGROUND OF THE INVENTION

1. Field of the Invention

The present invention concerns an improved electrode assembly which is especially adapted for use in a lithium-type fused salt battery, i.e., a battery wherein lithium ions are utilized as a means of producing electrical current. The electrode assembly comprises an inner conductive member, a header for making electrical contact with the inner conductive member, and a covering layer of porous carbon which essentially encases the inner conductive member with the layer of porous carbon preferably having an apparent density ranging from about 0.7 to about 1.0 grams per cubic centimeter.

2. Description of the Prior Art

Fused salt batteries are well known in the electric storage battery art. Broadly, a fused salt battery is a heatactivated battery which works on the principle that when heated above their fusion temperature, fused salts are ionically conductive and therefore will act as an electrolyte under the proper circumstances. In one system, a lithium-type fused salt battery is formed by immersing suitable electrodes in a lithium chloride-potassium chloride electrolyte. The anode is formed from a lithium-aluminum alloy with the cathode being fabricated from graphitic carbon.

In the above described type of lithium fused salt battery a special type cathode is usually utilized. Specifically, a cathode is generally employed which consists of a solid graphite slab or segment which has bonded to one surface thereof a planar carbon structure (such as electrodes are generally described in U.S. Pat. No. 3,447,968).

While the above general type of lithium fused salt battery performs suitably under certain circumstances, it is not free from operating defects. Particularly, difficulties are experienced in connection with the electrode (cathode) structure. In use, the porous segment of the electrode often separates from the solid graphite electrical conductor. When this happens to a limited degree the operating efficiency of the cell is decreased and an electrical short can occur. When there is total separation of the porous member from the graphite electrical conductor the cell ceases to function satisfactorily and an electrical short is almost assured to occur.

Accordingly, it is the principal object of the present invention to provide an electrode assembly which is suitable for use in a fused salt battery, in particular a lithium-type fused salt battery, which is not subject to the defects of prior art fused salt battery electrodes.

Other objects of the invention will become apparent to those skilled in the art from a reading of the following specification and claims.

SUMMARY OF THE INVENTION

The present invention concerns an improved electrode assembly which is adapted for use in a lithium-typed fused salt battery. The electrode assembly comprises an electrically conductive current collector member, an electrically conductive header member in electrical contact with the current collector member for making electrical contact therewith, and a surface layer of porous carbon essentially surrounding the outer surface portion of the current collector with the porous carbon being capable of absorbing lithium ions. In the preferred form the porous carbon has an apparent density ranging from about 0.7 to about 1.0 grams per cubic centimeter.

In another aspect, the present invention concerns a method of forming an improved electrode assembly which is adapted for use in a lithium-type fused salt battery. Specifically, the method includes the steps of forming a mixture of porous carbon and a binder, filling a mold section with a portion of said mixture, positioning additional porous carbon on the upper surface of the current collector with the porous carbon being present in an amount sufficient to at least cover the exposed surface of the current collector and about one-half of total mixture on each side of current collector, molding said mixture to shape by the application of pressure, heating said mixture while under pressure to a temperature sufficient to cure the binder, cooling the molded article while under pressure, and removing the article from the mold and heating it in an inert atmosphere to a temperature sufficient to carbonize the binder.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and herein:

Referring now to the drawings there are shown various embodiments of the invention. These embodiments are presented for the purposes of illustrating the invention and not for the purpose of limiting same. In the drawings like components are identified by similar numerals.

In FIG. 1 there is shown in generally rectangular form an electrode assembly 10 of the invention having a top wall 12, a bottom wall 14, opposed first and second side walls 16, 18 and opposed first and second end walls 20, 22. The electrode assembly includes a generally flat current collector 24 which has affixed thereto a header 26. The header is generally rectangular in shape and is provided with a slot 28 for receiving the current collector member. The current collector is held in place by a plurality of connecting means, i.e., metal pins 30. The header has an exposed surface 32 for making electrical contact with the electrode assembly.

The electrical conductor is encased or encapsulated in continuous porous carbon layer or envelope 34. The porous carbon is bonded together by means of a carbonized binder which also bonds the porous carbon layer to the current collector and header.

Figure 1:
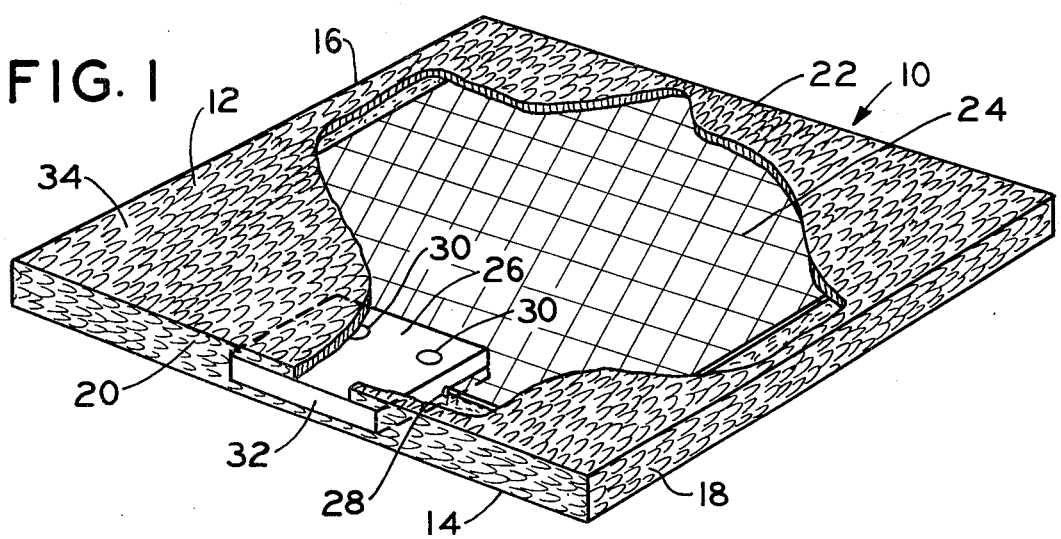
FIG. 1 is an isometric view, partly in cross-section, of an electrode assembly of the invention.
Figure 2:
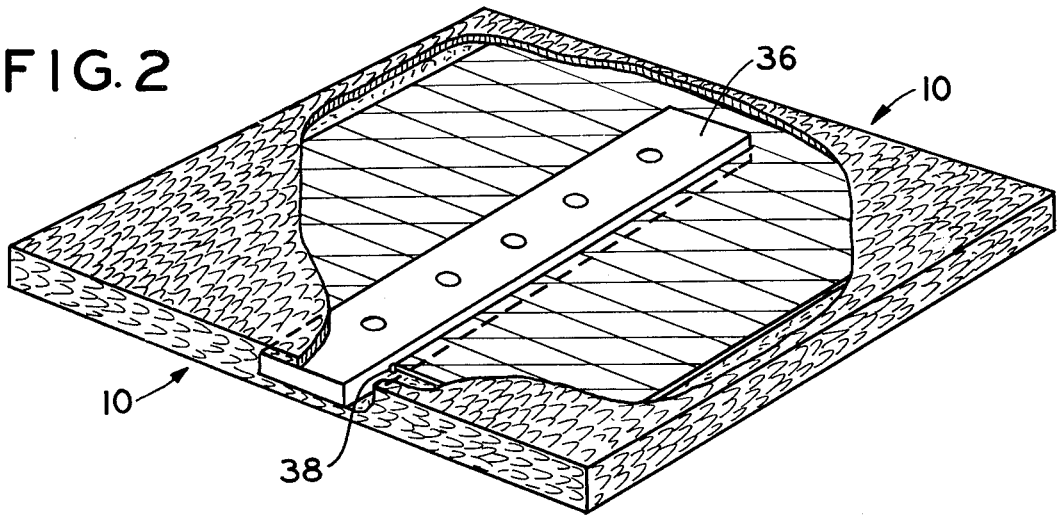
FIG. 2 is an isometric view, partly in cross-section, of another embodiment of the invention having an alternate header arrangement.

In FIG. 2, there is shown an electrode assembly 10 which is similar in construction to that illustrated in FIG. 1 with the only significant difference being the header 36 which is in the form of an elongated rectangle. The head 36 is provided with a slot 38 for receiving the electrical collector member 24. The header is connected to the current collector by means of press fit connector pins 30.

Figure 3:
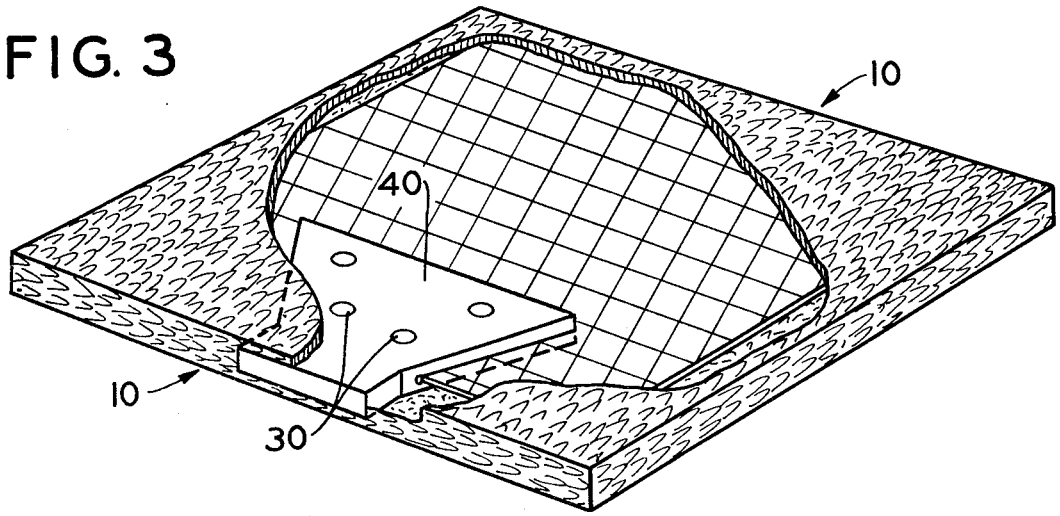
FIG. 3 is an isometric view, partly in cross-section, of still another embodiment of the invention having a still different header arrangement.

In FIG. 3 there is shown an electrode assembly 10 which is similar in construction to the various embodiments illustrated in FIGS. 1 and 2, respectively, with the only significant difference being the form of the header 40. In the embodiment shown in FIG. 3, header 40 is generally fan-shaped. That is, the portion thereof which receives the current collector 24 is flared out. The header is connected to the current collector by means of press fit connector pins 30.

Description of the Preferred Embodiments of the Invention

The present invention concerns an electrode assembly for use in a lithium-type fused salt battery which includes an electrical current collector member, an electrically conductive header member in electrical contact with the current collector for making electrical contact therewith, and a surface layer of porous carbon bonded to and essentially encasing the current collector and header members with the porous carbon being capable of absorbing lithium ions. In the preferred embodiment of the invention the porous carbon layer has an apparent density ranging from about 0.7 to about 1.0 grams per cubic centimeter.

In the fabrication of the electrode assembly of the invention a current collector may be utilized which is fabricated from essentially any type of graphitic carbon. It can be fabricated from such known materials as graphite textiles (including graphite cloth and graphite felt), compressed layers of expanded graphite, small sticks of high purity graphite, pyrolytic graphite, or from a layer of moldable graphite powder. The exact form of the current collector is not critical although it is preferred to utilize a collector which is essentially flat or sheetlike. All that is required is that it provide an electrically conductive path for maximum use of the porous carbon.

The header member can be fashioned from any type of high-density, high - purity graphite. In the preferred embodiment graphite having a density of 1.82 grams per cubic centimeter was utilized. It can be electrically connected to the current collector by any suitable means. Typically, such means include electrically conductive cements, metal spraying or mechanical devices such as pins or rivets. Since such bonding techniques are well known in the art they will not be discussed herein in detail.

The exact form of the header is not critical. In its preferred form it is generally rectangular in shape with one end thereof being fan-shaped or generally flared out, if desired. A slot is provided along its longitudinal axis for engaging the electrical collector member. While good results are obtained with a so-designed header, other designs may also be utilized.

Any suitable form of porous carbon may be used in the practice of the invention. All that is required is that it be compatible with the electrolyte and capable of absorbing lithium ions. Porous carbon having a surface area about 450M$^2$/gm has been found most suitable in the practice of the invention. The porous carbon is molded in place around the current collector. Any suitable binder can be used to solidify the porous carbon layer and bond it to the current collector. Typical resins which have been used with a high degree of success for this purpose are phenolic resins and pitches. All that is required is that the particular binder be thermally curable at a low temperature to form a temporary bond and capable of carbonizing at elevated temperatures to form a permanent carbon bond.

As before noted the electrode assembly of the invention is adapted for use in connection with a lithium-type fused salt cell. Such a cell generally utilizes a lithium chloride-potassium chloride electrolyte. One electrode is formed from a carbonaceous material. When the electrolyte material is heated to a temperature above its fusion point, lithium ions migrate to the carbon electrode thereby giving it a positive charge. Applicants have discovered that when a carbon electrode having a porous carbon collector media is utilized in such a fused salt cell the density of the porous carbon should not be greater than about 1.0 gram per cubic centimeter. If the density is much greater than 1.00 gram per cubic centimeter the porous carbon will not absorb the lithium ions. Conversely, if the density of the porous carbon is less than about 0.7 it will not support the weight of the lithium ions.

The electrode assembly of the invention is generally fabricated as follows:

1. 544 grams of porous carbon having a surface area of 450M$^2$/gm is mixed with 363 grams of Durite (phenolic) binder,
2. 907 grams of a mixture of carbon and binder are poured into the bottom cavity of the mold and spread evenly so that the mix has the same general overall thickness,
3. part of the mix is removed to provide space for the header,
4. the current collector is inserted and pinned in the slot in the header and placed on top of the mix,
5. additional mix as in No. 1 above is placed on top of the current collector and header,
6. the mold is closed and pressure applied thereto to form the desired structure,
7. the mold is heated while under the pressure to a temperature sufficient to set the binder,
8. the heated mold is kept under pressure and allowed to cool to room temperature,
9. the mold is then opened and the solidified mass removed therefrom and
10. the electrode assembly is then placed in a furnace and baked in an inert atmosphere to a temperature of about 900° C. to carbonize the binder.

The resultant structure is then removed from the furnace and is ready for use.

In the above process, it is critical that the pressure be applied in a manner such that the resultant density of the porous carbon range from about 0.7 to about 1.0 grams per cubic centimeter. If the density of the porous electrode is in excess of about 1.0 grams per cubic centimeter, it will not permit the lithium metal (ions) to enter the electrode structure so as to charge the electrode. On the other hand, if the density of the porous carbon is less than about 0.7, it will not support the weight of the lithium metal ions and therefore cause the electrode to malfunction.

Electrode assemblies of the type herein described have been formed having exterior dimensions of 10 × 12 ⅜ × 1 inch. They have been used in fused salt cels of the above described type and have performed satisfactory.

From the foregoing it is apparent that the present invention provides a unique electrode assembly which is ideally suited for use in a lithium-type fused salt battery.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electrode assembly for use in a lithiumtype fused salt battery comprising:
   an electrical current collector member composed of graphitic carbon;
   an electrically conductive header member in electrical contact with said current collector for making electrical contact therewith said header being composed of graphitic carbon; and
   a surface layer of porous carbon bonded to and essentially encasing the current collector member, said porous carbon, having an apparent density ranging from about 0.7 to about 1.0 grams per cubic centimeter and being capable of absorbing lithium ions.

2. The electrode assembly of claim 1 wherein said current collector is essentially flat.

3. The electrode assembly of claim 1 wherein said header member is formed from high density graphite.

4. The electrode assembly of claim 1 wherein said header member is generally rectangular in shape.

5. The electrode assembly of claim 1 wherein said header member has a slot therein for receiving said current collector.

6. The electrode assembly of claim 1 wherein said porous carbon has a surface area of at least about 450 $M^2$/gram.

7. The electrode assembly of claim 4 wherein said header member is provided with a slot along its longitudinal axis for engaging said electrical collector.

8. The electrode assembly of claim 7 wherein said collector member is affixed to said header by means of at least one connecting means.